Dec. 13, 1960   J. A. NEFF   2,964,567
PREPARATION OF LIQUID REACTION PRODUCTS OF
DIBORANE AND UNSATURATED HYDROCARBONS
Filed Dec. 1, 1955
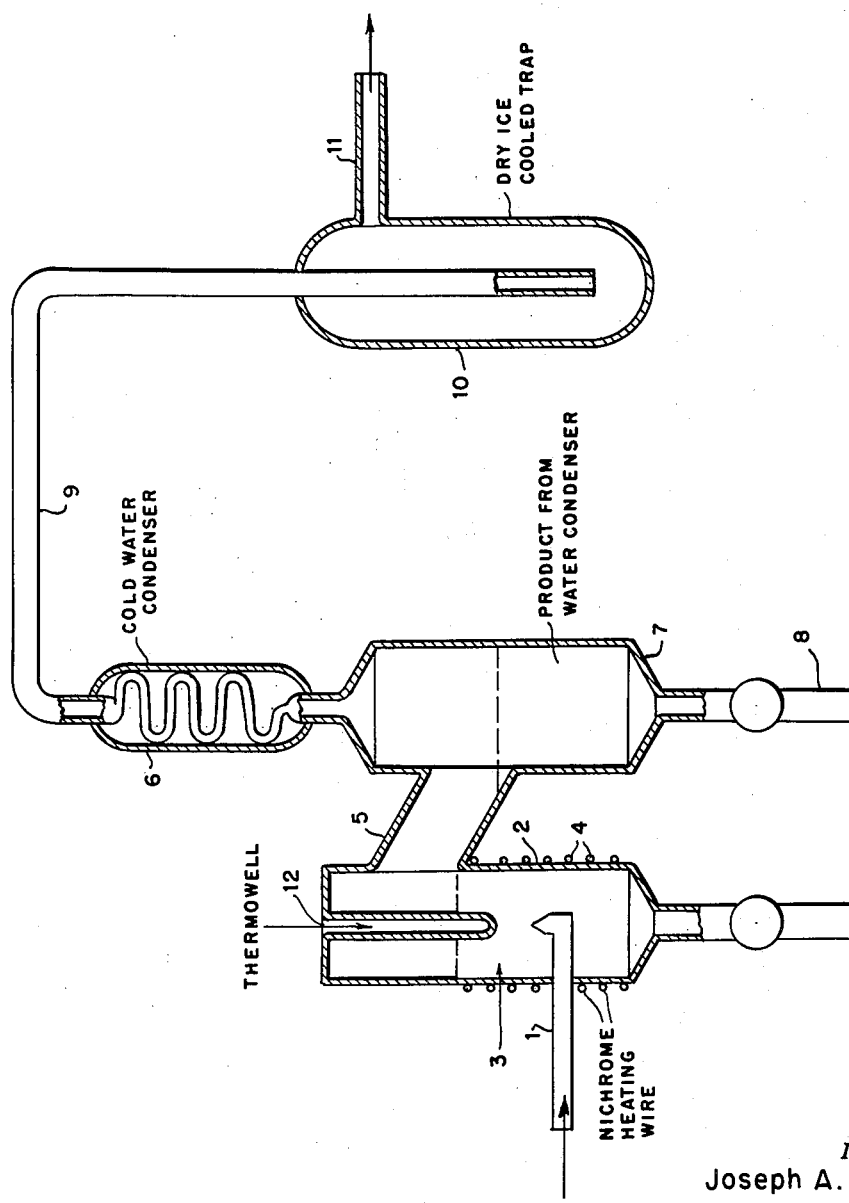
INVENTOR.
Joseph A. Neff
BY
Adams, Forward and McLean
ATTORNEYS United States Patent Office 2,964,567
Patented Dec. 13, 1960

2,964,567

PREPARATION OF LIQUID REACTION PRODUCTS OF DIBORANE AND UNSATURATED HYDROCARBONS

Joseph A. Neff, Niagara Falls, N.Y., assignor, by mesne assignments, to Olin Mathieson Chemical Corporation, a corporation of Virginia Filed Dec. 1, 1955, Ser. No. 550,301

2 Claims. (Cl. 260—606.5)

This invention relates to a method for the production of liquid borohydrocarbons by reacting diborane and an unsaturated hydrocarbon having from 2 to 4 carbon atoms. The liquid borohydrocarbons produced are useful as fuels when burned with air as described in application Serial No. 533,944, filed September 13, 1955, in the names of Earl A. Weilmuenster and Joel A. Zaslowsky.

The production of liquid borohydrocarbons has been previously proposed by the reaction of diborane and unsaturated hydrocarbons in the gaseous phase and in admixture with an inert diluent gas at temperatures elevated by indirect heat exchange. When such reactions are carried out, however, it has been found that in addition to the liquid borohydrocarbons produced a considerable amount of solids are formed, and that these solids tend to clog the product recovery lines and condensers. I have now found that the formation of solids can be appreciably reduced during the reaction of diborane and unsaturated hydrocarbons in admixture with a diluent gas by passing the gaseous mixture into and through a mass of liquid fluorocarbons maintained within the reaction temperature range.

Thus, according to the method of my invention, gaseous diborane together with a gaseous unsaturated hydrocarbon having from 2 to 4 carbon atoms and a diluent gas are passed into a mass of liquid fluorocarbons maintained at a temperature within the range of about 140° C. to 250° C. The unsaturated hydrocarbons employed in the process of my invention include, for example, ethylene, propylene, 1-butene, 2-butene, isobutylene, acetylene, methyl acetylene, propadiene, and butadiene.

By fluorinated hydrocarbons I mean those hydrocarbons in which all, or almost all, of the hydrogen has been replaced by fluorine alone or by fluorine and other halogen. Carbon fluorides, i.e., those compounds consisting entirely of carbon and fluorine, are more stable and are therefore preferred over the completely halogenated hydrocarbons which contain halogen atoms other than fluorine. The latter in turn are preferred to almost completely halogenated hydrocarbons which contain hydrogen atoms. The use of fluorocarbons other than carbon fluorides represents a compromise between the desired ideal and the difficulty of preparation of completely fluorinated hydrocarbons.

The fluorocarbons useful in the process of my invention are aliphatic and cyclic fluorocarbons generally having normal boiling points between room temperature and 300° C. Preferably the fluorocarbons employed are those having normal boiling points substantially higher than the temperature of the diborane-unsaturated hydrocarbon reaction so that elevated pressures are not necessary during the reaction, although pressures effective to maintain the fluorocarbons in liquid phase may be employed.

Examples of useful fluorocarbons are:

Perfluoro-n-pentane ($C_5F_{12}$);
Perfluoro-n-hexane ($C_6F_{14}$);
Perfluoro-n-heptane ($C_7F_{16}$);
Perfluoro-methylhexane and dimethylpentanes ($C_7F_{16}$);
Perfluoro-2,2- and 2,4-dimethylpentanes ($C_7F_{16}$);
Perfluoro-2,2,3-trimethylbutane ($C_7F_{16}$);
Perfluoro-2,2,4-trimethylpentane ($C_8F_{18}$);
Perfluoro-n-hexadecane ($C_{16}F_{34}$);
Perfluoro-cyclopentane ($C_5F_{10}$);
Perfluoro-methylcyclohexane ($C_7H_{14}$);
Perfluoro-dimethylcyclohexanes ($C_8F_{16}$);
Perfluoro-1,3,5-trimethylcyclohexane ($C_9F_{18}$);
Perfluoro-indan ($C_9F_{16}$);
Perfluoro-naphthalane ($C_{10}F_{18}$);
Perfluoro-1-methyl naphthalane ($C_{11}F_{20}$);
Perfluoro-2-methyl naphthalane ($C_{11}F_{20}$);
Perfluoro-dimethyl naphthalanes ($C_{12}F_{22}$);
Perfluoro-acenaphthane ($C_{12}F_{20}$);
Perfluoro-fluorane ($C_{13}F_{22}$);
Perfluoro-phenanthrane ($C_{14}F_{24}$);
Perfluoro-fluoranthane ($C_{16}F_{26}$);
Perfluoro-anthracane ($C_{14}F_{24}$);

Diluent gases useful in my invention are hydrogen, nitrogen, argon, or mixtures thereof.

The relative amounts of diborane and unsaturated hydrocarbons used in the process of my invention can be varied widely. In general, however, the molar ratio of diborane to unsaturated hydrocarbon will be within the range from 0.5:1 to 10:1. In the case of the lower diborane to unsaturated hydrocarbon ratios, however, the liquid products produced are not as high in heat of combustion as those produced when mixtures relatively rich in diborane are employed.

The amounts of diluent gas introduced into the reaction zone can also be varied widely, the amount so introduced in practice being dependent upon the amount of diluent required to effect efficient mixing and heat transfer necessary for any particular mode of operation. In general, the gases entering the reaction system (diborane, unsaturated hydrocarbon and diluent gas) will be composed of from about 20 to 90 percent by volume of diluent gas.

The process of my invention is illustrated in the following examples. The reaction system employed in carrying out the procedure of Examples I and II is shown in the accompanying drawing.

In the single figure a gaseous mixture of diborane, unsaturated hydrocarbon and diluent gas is introduced through line 1 into reaction zone 2 containing liquid fluorocarbon 3 heated by Nichrome heating wire 4. The liquid fluorocarbon is maintained at a temperature within the range of about 140° C. to 250° C. The reaction effluent passes through the confined passage 5 and into water condenser 6. The liquid product from condenser 6 flows back into collector 7 and is withdrawn through valved line 8. The uncondensed portion of the reaction effluent passes overhead through line 9 and into Dry Ice trap 10. Uncondensed portions of the reaction effluent are withdrawn through line 11.

*Example 1*

Approximately 100 grams of Fluorocarbon FCX–330 (Du Pont) is introduced into reaction zone 2. This fluorocarbon has an approximatel empirical formula $C_{14}F_{30}$; a boiling range of 65° C. to 130° C. at 10 mm. Hg; an approximate molecular weight of 738; density of 1.994 gm./cc. at 25° C.; and an index of refraction $n_D^{25}$ 1.3171 at 25° C.

A feed stream of hydrogen, diborane, and allence in the molar ratio of 4:2:1 is introduced at the rate of 200, 100 and 50 ml. per min. respectively. The reaction starts when the temperature of the fluorocarbon as measured through thermowell 12 reaches 152° C. The temperature range during the reaction period of 1 hour varies between 152° C. and 170° C. The product is collected in two fractions, the first fraction in collector 7, and the second fraction in trap 10. These products contain respectively 28.7 and 30.2 percent boron. There is only a slight accumulation of solids in the reaction system.

*Example II*

The procedure of this example is the same as that of Example I except that the time of reaction is extended to 2 hours during which the temperature ranges between 140° C. and 150° C. The reaction appears to stop when the temperature drops below 140° C. and does not resume until the temperature reaches 139° C. The products are then collected in two fractions, the first fraction of approximately 10 ml. in collector 7, and the second fraction of approximately 10 ml. in trap 10. The fraction from collector 7 contains 30 percent boron. The fraction from trap 10 was distilled at 200 mm. Hg through a glass helices-packed column about 15″ long. About half of the 10 ml. charge was distillable at a 60° C. maximum pot temperature. The vapor temperature varies between 35° C. to 37° C. during the distillation. Samples of the residue contain 21.1–22.3 percent boron. Samples of the distillate contain 29.7 and 30.3 percent boron. Again there is only a slight accumulation of solids in the reaction system.

The fluorocarbons employed in the process of my invention can be produced on a large scale by direct fluorination by means of a high-valence metal fluoride, for example:

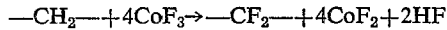
$$-CH_2- + 4CoF_3 \rightarrow -CF_2- + 4CoF_2 + 2HF$$

This method has been used to prepare fluorocarbons containing from 1 to more than 20 carbon atoms starting with the corresponding hydrocarbons. High yields are obtained from the hydrocarbons up to $C_{10}$, but the higher-boiling hydrocarbons usually suffer some carbon-to-carbon fission during the reaction with loss in yields. The reaction is usually carried out in horizontal, mechanically agitated steel reactors containing a bed of powdered cobalt trifluoride, and it proceeds smoothly at temperatures between 150° C. and 350° C., depending upon the boiling point of the hydrocarbon. The cobalt difluoride formed is reconverted to cobalt trifluoride by elementary fluorine at similar temperatures and in the same reactor.

I claim:

1. A method for the production of liquid reaction products of diborane and an unsaturated hydrocarbon which comprises passing gaseous diborane and a gaseous unsaturated hydrocarbon having from 2 to 4 carbon atoms in a molar ratio of 0.5 to 10:1 together with an amount of an inert diluent gas sufficient to provide 20 to 90 percent by volume of the total entering gas into a mass of liquid fluorocarbon selected from the class consisting of saturated aliphatic fluoroalkanes, fluorocycloalkanes and fluoroalkyl substituted fluorocycloalkanes having a normal boiling point between room temperature and 300° C. maintained at a temperature within the range from about 140° C. to 250° C.

2. The method of claim 1 in which the gaseous unsaturated hydrocarbon is allene.

References Cited in the file of this patent

UNITED STATES PATENTS 2,691,052 Cines _____ Oct. 5, 1954

OTHER REFERENCES

Hurd: J. Amer. Chem. Soc., 70, pages 2053–55 (1948).

Hurd: Chemistry of the Hydrides, John Wiley & Sons, New York (1952), pages 86–88 relied on.